(12) United States Patent
Kemmerling (10) Patent No.: US 8,425,324 B2
(45) Date of Patent: Apr. 23, 2013

(54) BALANCING TOOL

(75) Inventor: Stephen Kemmerling, Saarbrücken (DE)

(73) Assignee: X-Aitment GmbH, Quierschied (DE)

(*) Notice: Subject to any disclaimer, the term of this patent is extended or adjusted under 35 U.S.C. 154(b) by 780 days.

(21) Appl. No.: 12/192,824

(22) Filed: Aug. 15, 2008

(65) Prior Publication Data

US 2009/0048008 A1    Feb. 19, 2009

(30) Foreign Application Priority Data

Aug. 17, 2007    (EP) .................... 07016175

(51) Int. Cl.
*A63F 9/24* (2006.01)

(52) U.S. Cl.
USPC .................................................... 463/42

(58) Field of Classification Search ........... 463/1, 42
See application file for complete search history.

(56) References Cited

U.S. PATENT DOCUMENTS

| | | | |
|---|---|---|---|
| 2003/0038428 A1 | 2/2003 | Yotoriyama | |
| 2004/0143852 A1* | 7/2004 | Meyers | 725/133 |
| 2006/0046854 A1 | 3/2006 | Arevalo Baeza et al. | |
| 2007/0197296 A1* | 8/2007 | Lee | 463/42 |

FOREIGN PATENT DOCUMENTS

WO    2006127357    11/2006

OTHER PUBLICATIONS

StarCraft, Copyright 1998 Blizzard Entertainment, pp. 11-16.*
Brian Green, "Balancing Gameplay for Thousands of Your Harshest Critics". In Thor Alexander (editor), "Mas-sively Multiplayer Game Development 2", pp. 35-55, Hingham, 2005, Charles River Media.
Ben Hanson, "Game Balance for Massively Multiplayer Games". In Thor Alexander (editor), "Massively Multi-player Game Development", pp. 30-37, Hingham, 2003, Charles River Media.
John M. Olsen, "Game Balance and AI Using Payoff Matri-ces". In Thor Alexander (editor), "Massively Multi-player Game Development", pp. 38-48, Hingham, 2003, Charles River Media.
M.J.D. Powell, "A Hybrid Method for Nonlinear Equa-tions". In P. Rabinowitz (editor), "Numerical Methods for Nonlinear Algebraic Equations", pp. 87-114, Lon-don, 1970, Gordon and Breach.
M.J.D. Powell, "A Fortran Subroutine for Solving Sys-tems of Non-linear Algebraic Equations". In P. Rabi-nowitz (editor), "Numerical Methods for Nonlinear Alge-braic Equations", pp. 115-161, London, 1970, Gordon and Breach.

* cited by examiner

*Primary Examiner* — Omkar Deodhar
(74) *Attorney, Agent, or Firm* — IPXLAW Group LLP; Claude A. S. Hamrick (57) ABSTRACT

The invention provides for balancing a computer game, in which players can choose between different options for a plurality of actors within the game. The actors are described by parameter vectors defining characteristics of each actor. The cost of each actor is calculated, wherein the cost of an actor characterizes the amount of resources needed to obtain the actor. Also, the rank of each actor is defined, wherein the rank of an actor characterizes a usefulness or a value of the actor. The parameters of the actors are modified until the rank and the cost of the actors are proportional for each actor, wherein the constant of proportionality is the same for all actors. Thus, the various options become approximately equally successful and the computer game is balanced.

5 Claims, 6 Drawing Sheets

BALANCING TOOL

BACKGROUND OF THE INVENTION

The invention deals with computer simulations or computer games (in the following called games).

FIELD OF THE INVENTION

In the area of games, more and more emphasis is put to the balancing of the game. The balance of the game is a concept in game design describing balance of power or fairness in a game between different player and non-player characters, strategic options etc.

Games that give players the choice between several, significantly different options (e.g. different armies and technologies in real-time-strategy games, different fighters with diverse fighting skills in fighting games, various character classes in role-playing games etc.) will be considered balanced, if the various options—despite their qualitative differences—are approximately equally viable and successful. In a suitably balanced game, players would opt based on their personal playing style, preferences and skills, rather than on inherent advantages in the available options.

A game that is adequately balanced in this sense will give approximately equally skilled players—choosing different available options—approximately equal chances of winning.

However, usually there is the problem of how to balance a game in a reasonable, efficient and reproducible way.

DESCRIPTION OF RELATED ART

It is a common approach to balance the games manually, i.e. various testers play the game and report subjective imbalances which ought to be leveled out (e.g. [BG05]).

Techniques that allow a more quantitative analysis for testers are so-called game-metrics (e.g. [BH03]) and pay-off matrices (see [JO03]).

Game-metrics are methods that monitor relevant parameters during the game and make them available for a statistical analysis (e.g. frequency of item-usage or actions, temporal development of player scores etc.). This technique, however, is still to be seen as assistance to a manual balancing process.

Pay-off matrices are based on mathematical game theory and are designed to numerically map the positive or negative effects of the actions of two or more players in matrix schemes. The symmetry properties of these matrices, as well as the calculation of so-called Nash-equilibriums in the scenarios represented by these matrices, help retrieve information on imbalances between game elements involved in the scenarios. The automated generation of pay-off matrices for various scenarios leads to large amounts of data that are accessible for analysis.

As in the case of game metrics, pay-off matrices do not provide direct hints at which game parameters need to be adjusted or, even more important, of how to tweak these parameters. This is again a matter of manual trial and error techniques.

BRIEF SUMMARY OF THE INVENTION

It is, therefore, an object of the present invention to provide a tool for enabling a largely automated balancing process for games.

This aim is achieved by the inventions as claimed in the independent claims. Advantageous embodiments are described in the dependent claims, the disclosure of which is hereby incorporated into the description by reference.

Although no multiple referenced claims are drawn, all reasonable combinations of the features in the claims shall be disclosed.

The object of the invention is i.a. achieved by a method. In what follows, individual steps of a method will be described in more detail. The steps do not necessarily have to be performed in the order given in the text. Also, further steps not explicitly stated may be part of the method.

For the balancing of games we need an appropriate concept of balance, first. For this purpose we introduce the concepts of "cost" and "rank" of a game element. It is the rank of a game element that characterizes the usefulness or value of the element in a game. A game is considered balanced, when the costs of a game element are justified by its rank. More precisely, the game is considered to be balanced if rank and cost are proportional for each game element, where the constant of proportionality is required to be the same for all related game elements. Precise definitions of cost and rank require some more preliminaries.

Game elements are categorized as follows:
i) "Actors": elements of the game that can actually perform actions (e.g. player characters, non-player characters, production units etc);
ii) "Resources": inherent game elements which can be consumed or produced by actors (e.g. consumption of wood and iron in a forge produces a cross-bow);
iii) "Upgrades": game elements representing a certain know-how which changes the properties or behaviors of instances of actors (e.g. heavy cross-bow as an upgrade to cross-bow inflicting more damage with a better range; speed boots as an upgrade to humanoid player characters doubling their movement speed, etc.);
iv) "Technologies": game elements representing a certain know-how that makes game elements available (e.g. a monastery as a building that makes available battle monks; knowledge of steel production making available tanks and battleships, etc).

Briefly, the present invention provides for balancing a computer game, in which players can choose between different options for a plurality of actors within the game. The actors are described by parameter vectors defining characteristics of each actor. The cost of each actor is calculated, wherein the cost of an actor characterizes the amount of resources, i.e., inherent game elements which can be consumed or produced by actors, needed to obtain the actor. Also, the rank of each actor is defined, wherein the rank of an actor characterizes a usefulness or a value of the actor. The parameters of the actors are modified until the rank and the cost of the actors are proportional for each actor, wherein the constant of proportionality is the same for all actors. Thus, the various options become approximately equally successful and the computer game is balanced.

The set of actors, resources, upgrades and technologies will be denoted A,R,U,T, respectively. Note that these sets are not necessarily disjoint, i.e. there might be game elements that belong to several of these sets (e.g. in a real time strategy game (RTS game) it might be necessary to have armored vehicles in order to make available heavy tanks. The armored vehicle is then an actor (the player can control it) as well as a technology). G is the union of A,R,U,T and denotes the set of all game elements.

Furthermore, in each game there can be different parties or factions (e.g. the blue army and the green army; orcs, elves and dwarfs, etc.) with access to possibly different game elements. F denotes the set of all factions in the game. Each faction f∈F represents all the game elements available to that very faction (e.g. all the tanks, boats, soldiers etc. available for the blue army (which is the name of the faction) are considered to be in the blue faction), i.e. more precisely we have is f ⊂ G. Again, if there are several factions, they need not necessarily be disjoint.

In order to do something about a possible imbalance of the game, it is necessary that the characteristics of game elements can be modified. For this purpose, each actor and upgrade is associated with a corresponding parameter vector (i.e. a collection of parameters that define the behavior of the respective game element). From a technical point of view, it is quite irrelevant what the entries of this parameter vector actually represent (strength of a character, magic points of a wand, range of a weapon, etc.); it is just necessary to determine how the behavior of actors, or the effects of upgrades, are influenced by the parameter vector. Note that only actors and upgrades have a parameter vector as they are the only game elements exhibiting complex behavior. Technologies are essentially unary in their effect, i.e. they make exactly one other game element available and do nothing else (if a technology makes available several game elements, it can be treated as several technologies). Resources can only be acted upon, not act themselves, so there is no need for a parameter vector here.

1. Costs

This section presents a thorough definition of the concept of costs that is essential for the balancing approach. Defining costs needs to take into account that some resources may be harder to obtain for one faction than for another. Otherwise the costs of game elements from different factions would not be comparable.

The absolute cost associated with a given game element ge, in terms of resource r, is denoted by $acost_{ge}(r)$ and represents the amount of units of that particular resource needed to obtain one instance of the game element.

The aforementioned possibility of different values of resources for different factions in a game is accounted for by the concept of faction modifiers in terms of time. The faction modifiers are used to scale the absolute costs of game elements to make them comparable even in between different factions.

The faction modifier, $m_f(r)$, associated with a given faction f, with respect to a resource r, is defined to be the total amount of time necessary to obtain one unit of the resource, averaged over all possible ways in which the resource can be obtained. As an alternative approach, the faction modifier $m_f(r)$ can also be defined to be the minimum total production time of all actors of the faction f that produce resource r. Using the "minimum" definition for the faction modifiers, balancing will only consider the cheapest way a faction can use to obtain a resource. The "average" definition treats every way of obtaining a resource equally.

Basically there are infinitely many different ways to define faction modifiers, e.g. one could use weighted sums, thus emphasizing certain production ways while reducing the weight of others. Which actual definition is used depends on the concept of the game. See section 6.2. for an example of how to calculate faction modifiers.

The relative cost of a given game element ge for a member of a faction f in terms of resource r is the corresponding absolute cost scaled by the respective faction modifier, i.e.

$$rcost_{f,ge}(r) = m_f(r) acost_{ge}(r).$$

The total $cost_f(ge)$ of a game element ge of faction f is defined to be the sum of all relative costs of the game element with respect to the necessary resources, summed over the necessary resources, i.e.

$$cost_f(ge) = \Sigma_{i=1}^{k} m_f(r_i) acost_{ge}(r_i) cost(ge) = \Sigma_{i=1}^{k} m_f(r_i) acost_{ge}(r_i),$$

where $r_i$, i=1, 2, ... k are the resources necessary to obtain one unit of the game element.

It is the total cost of a game element that is the foundation for the automated balancing process.

Calculation of Faction Modifiers

The total cost of a game element is fundamental for the approach to balancing and the faction modifiers are mandatory to obtain the total costs. Calculating the faction modifiers is based on the flow of resources between actors in the game.

What follows is based on the assumption that every actor is allowed to produce just one type of resource. (This limitation will be released in section "Multi-Function Game Elements".)

The flow of the resources is modeled with a directed acyclic graph (DAG), called the production DAG, the nodes of which are actors and the edges of which represent resource flow between the actors. If $a_i, a_j \in A$ are actors, then in the production DAG there will be a directed edge $[a_i, a_j>$ between the source $a_i$ and the destination $a_j$ if and only if $a_i$ produces a resource that is consumed by $a_j$ (see Section 6.2. and FIGS. 1 to 4 for examples).

The production cost function pcost is a mapping from the edges of the production DAG to the natural numbers and represents the number of units of a resource produced by the source of an edge and consumed by its destination.

If P(a) denotes the parameter vector of the actor a, then production time $time^{P(a)}$ is a mapping from the set of actors to the positive real numbers and is defined to be the time that actor a, with parameter vector P(a), needs to produce one unit of its output resource (the superscript will be omitted if no confusion is likely to arise).

The total time it takes an actor Ha to produce its output resources, including the time it takes to produce the respective input resources, is represented by the total production time ttime. Total production time is a mapping from the set of actors to the set of positive real numbers and can be calculated recursively using the production DAG, production cost and production time:

$$ttime(a) = \left( \sum_{a' \text{ is Parent of } a} ttime(a') pcost([a_i a_j >)) \right) + time^{P(a)}(a)$$

The faction modifier $m_f(r)$ in the "minimum" definition, for example, then equals the minimum total production time ttime of all actors of the faction f that produce resource r. Accordingly, using the "average" definition, the faction modifier $m_f(r)$ equals the average of the total production time ttime taken over all actors of the faction f that produce resource r.

Note that the total production time is defined on actors instead of directly on resources, because there can potentially be different paths through the production DAG, which finally produce the same resource, but which have a different total production time (e.g. in an RTS game it might be possible to collect 1 unit of wood in 5 time steps using a standard worker-unit, but 3 units of wood in 5 time steps using a special lumberjack-unit. Nevertheless both result in the same resource, i.e. wood. This might influence other resources as well, e.g. if the production of a sword requires a certain amount of wood, there are two paths through the production DAG, i.e. the one including the worker-unit and the one including the lumberjack-unit, that both lead to the same resource).

Technologies

To accurately quantify technologies and their effect on the game, another kind of cost is considered, i.e. cumulative cost.

What follows is based on the assumption that every technology makes available just one game element. (Note that this restriction will be released in section "Multi-Function Game Elements".)

The cumulative cost of a given game element ge (here especially technology, upgrade or actor), $ccost_f(ge)$ is the total cost of that game element plus the total costs of all technologies needed to make it available.

The relationship between technologies is modeled using a directed acyclic graph, the so-called technology DAG, the nodes of which are game elements and the edges of which represent technologies necessary for game elements (see FIGS. 5 to 8 for an example). That is, an edge [t,ge> of the technology DAG states that the technology t is necessary for game element ge.

This allows to express the cumulative cost of a given game element ge in the following way:

$$ccost_{f(ge)} = \left( \sum_{ge' \text{ is Parent of } ge} ccost_f(ge') \right) + cost_f(ge)$$

Since the cumulative cost of a game element is fully defined by its total cost (which can be calculated using the production DAG) and by the cumulative cost of its predecessors in the technology DAG, said cost can be computed for all game elements with a breadth-first search through the technology DAG, annotating each node with its cumulative cost while proceeding.

2. Rank

The actual calculation of the rank of an actor depends on the game under consideration. Since the rank needs to reflect the value of a game element within the game, even in one single game there might be several definitions of rank depending on the game elements under consideration.

In an RTS game, for example, battle participants might be ranked by the average ratio of damage done vs. relative damage taken (relative to the damage it can take in total, to avoid getting a higher rank through being destroyed quickly). In the same game a unit collecting a certain type of resources might be ranked by the inverse time necessary to collect one unit of that very resource. See section 6.1. for a more detailed example.

What follows defines the necessary theoretical concept of rank. The concept presented does not balance faction against faction but rather considers game elements on an individual basis, thus balancing game elements within each faction as well. This makes automated balancing of games with just one faction (e.g. games with no antagonists or confrontations in general) accessible as well.

The rank (rank function) of an actor a) with parameter vector P(a) is denoted $rank^{P(a)}(a)$ and is defined to be a mapping from subsets $A' \subset A$ of the set of actors to the set of positive real numbers (if no confusion is likely to arise, the superscript is omitted in the following). Note that the rank can have a dimension, depending on the game or game element to be ranked. Typical dimensions are time, inverse time, damage taken, money, inverse money, etc. The dimension of the rank can be different for different games or different game elements.

Note that it is highly desirable that rank is continuous with respect to changes in the parameter vector, as this greatly increases the choice of mathematical methods that can be used in the balancing process.

Ranking and Actor Kind Partition:

In order not to compare completely different things during the balancing process, the actors need to be partitioned into different, comparable kinds, i.e. each kind of actor is ranked by the same rank function.

A set RANK of rank functions $rank_1, \ldots, rank_k$ is called a ranking on the set of actors A, if and only if the domains of the rank functions are pairwise disjoint and the union of all domains of the rank functions equals the set of actors, i.e. it holds that $rank_i: A_i \subset A \to R^+$,    a)

$A_i \cap A_j = \emptyset$ for $i \neq j$ and    b)

$\cup_{i=1}^{h} A_i = A$.    c)

Each set $A_i$ is called a kind of actor and the set $\{A_1, \ldots, A_h\}$ is called the actor kind partition of A corresponding to the ranking RANK. Note that the actor kind partition is defined via a given ranking, not vice versa.

Upgrade Rank, Upgrade Ranking and Upgrade Kind Partition

To complete the prerequisites for the balancing process a ranking for upgrades needs to be defined.

What follows is based on the assumption that every upgrade effects just one actor. (Note that this restriction will be released in section "Multi-Function Game Elements".)

If u is an upgrade, with parameter vector P(u), affecting actor a, then the upgrade rank (or upgrade rank function) $urank^{P(u)}(u)$ of u is a mapping $urank: U' \subset U \to R$ and gives the change in the rank of a that is caused by $u^{P(u)}$ (if no confusion is likely to arise, the superscripts are omitted).

As a very simple example consider a game where there is an actor "soldier" that is ranked by its rate of fire, e.g. 10 rounds per second. Let "spitfire" be an update to soldier that increases the rate of fire of "soldier" to 15. Then the update rank of "spitfire" is 5.

Let RANK=$[rank_1, \ldots, rank_h]$ be a ranking on A. A set URANK of upgrade rank functions $urank_1, \ldots, urank_h$ is an upgrade ranking on U if and only if $urank_i: U_i \subset U \to R$,    a)

$\forall u \in U_i, u$ affects $a \in A \Rightarrow a \in A_i$,    and c)

$\cup_{i=1}^{h} U_i = U$.    c)

Each set $U_i$ is called a kind of upgrade, and the set $\{U_1, \ldots, U_h\}$ is the corresponding upgrade kind partition of U.

3. Balancing

A game is considered to be balanced if rank and cost are proportional for each game element, where the constant of proportionality is required to be the same for all related game elements. Consequently, balancing the game is based on the following system of equations:

$$\left( \left( rank_i^{p(a)=x_a}(a) = c_i \cdot cost_f(a) \right)_{a \in A_i} \right)_{A_i \in \hat{A}}$$

-continued $$\left(\left(urank_i^{p(u)=x_u}(u) = c'_i \cdot cost_f(u)\right)_{u \in U_i}\right)_{U_i \in \hat{U}}$$

$$\left(\left(rank_i^{p(a)=x_a}(a) = d'_t \cdot ccost_f(a)\right)_{a \in A_i}\right)_{A_i \in \hat{A}}$$

$$\left(\left(urank_i^{p(u)=x_u}(u) = d'_t \cdot ccost_f(u)\right)_{u \in U_i}\right)_{U_i \in \hat{U}}$$

where $\hat{A}$ and $\hat{U}$ are actor and upgrade kind partitions, $c_i$ is the constant of proportionality for actors, $c^i_t$ the constant of proportionality for upgrades, $d_t$ the constant of proportionality for technologies related to actors and $d^1_t$ the constant of proportionality for technologies related to upgrades.

The balancing process reduces to determine the roots of the above system of equations in the variables $x_a, x_u$ and absolute costs, i.e. in the parameter vectors of the game elements and the absolute costs of the game elements for all factions f simultaneously. That is, balancing means finding parameter vectors and cost values for the game elements that fulfill the above equations and consequently establishes the proportionality of rank and cost of the game elements. This, however, is our model of balancing (i.e. each game element is worth its price).

If other cost models, e.g. maintenance costs, are to be included in the balancing process, the above equations just need to be duplicated accordingly. E.g. if in a game there are maintenance costs maintenance for actors and upgrades and tech_maintenance for technologies related to actors and updates. Then the above balancing equations need to be complemented with the following equations for each faction f:

$$\left(\left(rank_i^{p(a)=x_a}(a) = k_i \cdot maintenance_f(a)\right)_{a \in A_i}\right)_{A_i \in \hat{A}}$$

$$\left(\left(urank_i^{p(u)=x_u}(u) = k'_i \cdot maintenance_f(u)\right)_{u \in U_i}\right)_{U_i \in \hat{U}}$$

$$\left(\left(rank_i^{p(a)=x_a}(a) = l_i \cdot tech\_maintenance_f(a)\right)_{a \in A_i}\right)_{A_i \in \hat{A}}$$

$$\left(\left(urank_i^{p(u)=x_u}(u) = l'_i \cdot tech\_maintenance_f(u)\right)_{u \in U_i}\right)_{U_i \in \hat{U}}$$

where $k_i$ is the constant of proportionality for the maintenance costs for actors, $k^i_t$ is the constant of proportionality for the maintenance costs for upgrades, $l_i$ is the constant of proportionality for the maintenance costs for technologies related to actors, and $l^1_t$ is the constant of proportionality for the maintenance costs for technologies related to upgrades.

4. Multi-Function Game Elements

In the previous sections there have been restrictions such that a) actors produce just one type of resource, b) technologies produce just one type of game elements, and c) upgrades effect just one type of actors;

i.e. the fact that a game element can be several things at once (that is the sets making up G are not necessarily disjoint) or can do several things (e.g. production unit that produces two different game elements) has not been accounted for in the balancing equations.

Consequently, in order to take these possibilities into account while using the same set of balancing equations, there is the need to require the sets making up G to be disjoint without losing the ability to model game elements that have more than one functionality. This is accomplished via the concept of namings.

A naming N is a mapping from the set of game elements to the natural numbers assigning each game element a (not necessarily unique) identifier. If, under the naming N, two different game elements have the same name, they are interpreted as to model different aspects of the same thing. Having established a naming, the costs of all game elements with the same name are to be combined to obtain the cost for the object represented by these game elements. To be more precise, the full cost fcost(ge) of a game element ge is the total cost of all game elements with the same name as ge under a given naming N, i.e.

$$fcost_f(ge) = \Sigma_{ge^1 \in [ge^1 \in G | N(ge) = N(ge^1)]} cost_f(ge^1).$$

If, for example, there is an actor a that is also a technology t which makes available a new actor $a_{new}$ as well as a new technology $t_{new}$ one can a) create a naming N, b) interpret the actor a as a pure actor part a' and a pure technology part t', c) interpret the pure technology part t' as a technology $t'_{a_{new}}$ creating the new actor and as a technology $t'_{t_{new}}$ creating the new technology, such that $N(a') = N(t'_{a_{new}}) = N(t'_{t_{new}})$ and use the definition of the full cost.

As a simple example, consider a game where there is a "priest" that is an actor, and additionally makes available a new actor called "paladin" and a new technology called "monastery". Consequently the "priest" is also a technology making available two different game elements. We interpret the "priest" as a pure actor called "priest_actor", as a technology "priest_tech_actor" making available the "paladin" and as a technology "priest_tech_tech"_making available the "monastery". A valid naming would map all the three names for the priest to the same number, e.g. 5, i.e.

$N$(priest_actor)=$N$(priest_tech_actor=$N$(priest-_tech_tech)=5.

$N$(priest_actor)=$N$(priest_tech_actor=$N$(priest-_tech_tech)

5. Summary

In order to apply the balancing formulae to a game it is necessary to a) know the absolute costs of all relevant game elements (this, however, is part of the game elements' specifications and, therefore, readily available);

b) compute the faction modifiers for each faction in the game (possible from the specifications of the game elements);

c) compute the total costs of the game elements (with the faction modifiers and the absolute costs known this is possible);

d) determine the cumulative costs of all relevant game elements (knowing the technology DAG, which is a game specification and therefore known, this is possible);

e) have an actor kind partition (this is heavily dependent on the game concept and needs to be constructed in accordance with the game design);

f) have the rank of all relevant actors.

It is point (f) that might be critical. The rank functions for the actors might be determined by the game specifications, but they might as well not be available in a straightforward way, making approximations necessary. However, rank approximations depend heavily on the game. An example for a real-time-strategy games is given in section "Examples".

Furthermore, the object of the invention is achieved by:
a computer loadable data structure that is adapted to perform the method according to one of the embodiments described in this description while the data structure is being executed on a computer,
a computer program, wherein the computer program is adapted to perform the method according to one of the embodiments described in this description while the program is being executed on a computer,
a computer program comprising program means for performing the method according to one of the embodiments described in this description while the computer program is being executed on a computer or on a computer network,
a computer program comprising program means according to the preceding claim, wherein the program means are stored on a storage medium readable to a computer,
a storage medium, wherein a data structure is stored on the storage medium and wherein the data structure is adapted to perform the method according to one of the embodiments described in this description after having been loaded into a main and/or working storage of a computer or of a computer network,
a computer program product having program code means, wherein the program code means can be stored or are stored on a storage medium, for performing the method according to one of the embodiments described in this description, if the program code means are executed on a computer or on a computer network,
at least one of an operating system, a computer readable storage medium having stored thereon a plurality of computer-executable instructions, a co-processing device, a computing device and a modulated data signal carrying computer executable instructions for performing the method according to one of the embodiments described in this description.

BRIEF DESCRIPTION OF THE SEVERAL VIEWS OF THE DRAWINGS

Other objects and advantages of the present invention may be ascertained from a reading of the specification and appended claims in conjunction with the drawings therein.

For a more complete understanding of the present invention, reference is established to the following description made in connection with accompanying drawings in which.

DETAILED DESCRIPTION OF THE INVENTION

6. Examples 6.1 Rank Approximation

If no information on the rank of game elements is given in the specifications of the game, rank needs to be approximated.

This is demonstrated in a real-time-strategy (RTS) scenario. Typical RTS games contain actors, upgrades, technologies and resources, as well. As a first step, a rather general actor kind partition for RTS games is defined:

a) Battle participants: actors participating in confrontations with other actors.

b) Battle participant builder: actors producing battle participants.

c) Resource collectors: actors extracting resources from the (virtual) environment (i.e. needing no input resources, i.e. sources in the Production DAG).

d) Resource converters: actors converting resources (i.e. interior nodes in the Production DAG).

e) Storage facilities: actors capable of storing resources.

f) Construction units: actors constructing battle participant builders, resource collectors, resource converters and storage facilities.

Note that these categories need not necessarily be disjoint.

In order to rank the actors the following rankings are used (note that this is arbitrary and completely depends on what makes sense for the game under consideration):

a) Battle participants: average ratio of damage done vs. relative damage taken (relative to the damage it can take in total, to avoid getting a higher rank through being destroyed quickly).

b) Battle participant builders: average rank of the units built weighted by their relative building time.

c) Resource collectors: inverse time taken to gather/produce one unit of the resource.

d) Resource converters: inverse of the sum of on one hand the relative value of the resources (i.e. amount of resource times respective faction modifier) needed to produce one unit of the output resource and on the other hand the time taken to do so.

e) Storage facilities: maximum storage capability relative to storage costs.

f) Construction units: relative value of resources turned into building per time unit.

Note that almost anything can be used for a ranking as long as it accurately reflects the performance of the game elements. The ranking is a very important part of the balancing process, as all the game elements are balanced according to that ranking. Note that for different groups of game objects the appropriate rank functions might have completely different physical dimensions. This is not a problem since rank functions of different groups will never be combined and consequently physical dimensions will not be mixed up. In the above example, the rank function for battle participants, for example, is dimensionless while for battle participant builders, resource collectors and resource converters the dimension of the respective rank functions is an inverse of time.

Actually computing the rank of resource converters, storage facilities and construction units can be done simply using their specification. Ranking resource collectors can be done by simply letting them act in a representative set of environments in the game and observing the results. (This is only necessary if the game is sensitive to different environments/scenarios. If it is not, the resource collectors can be ranked statically in analogy to resource converters, for example.)

Likewise, determining the rank of a battle participant builder is rather straightforward given the ranks of the corresponding battle participants. It is the rank of battle participants that needs more attention. Approximating the rank of battle participants means having them fight in various confrontations within the game. This, however, can become computationally infeasible as the number of units and the number of possible confrontations in different environments in the game increases.

Sampling

A way of effectively approximating the rank of battle participants is to sample various possible constellations and determine the rank of the battle participants in these samples. These sample data then serve as the basis to approximate the rank function for every single battle participant.

To be more concrete, for each faction we will chose various different groups, where each group consists of different numbers of the available battle participants. All the groups of all the factions are then combined to the set of all possible samples (via the Cartesian product) and these samples serve as the foundation of rank approximation. In what follows, the necessary formulism is provided.

Let f be a faction in the game and let BP(f) denote the set of battle participants of that very faction. A group $g_f$ over the faction f is a mapping from BP(f) to the natural numbers and maps each battle participant bp to the number of times it occurs in the group. $G_f$ denotes the set of all groups over f.

The similarity of two groups can be measured using the group similarity metric, i.e. $d_G: G_f^2 \rightarrow N$, with $$d_G(g_f, g'_f) = \sum_{bp \in BP(f)} |g_f(bp) - g'_f(bp)|$$

where $G_f^2$ is the Cartesian product of the set of all groups with itself.

The set of all samples is given by the product of the sets of groups over all factions, i.e. $S = \Pi_{f \in F} G_f$. Every finite subset of S is called a sampling. If s∈S is a sample, then $s_f$ denotes the component of s drawn from the faction f. A battle participant bp is said to be in the sample s if and only if there exists a faction such that $s_f(bp) \neq 0$. A sample that contains only one kind of battle participant is called atomic sample. (bp→n) denotes the atomic sample containing n instances of battle participant bp; ( ) denotes the empty sample. The sample size is just given by summing all the battle participants of a faction for all factions in the game, i.e. $|s| = \Sigma_{f \in F} \Sigma_{bp \in BP(f)} s_f(BP)$.

For an illustrative example of groups and samples, let a game consist of two factions, namely GoodGuys and BadGuys. The faction of the GoodGuys possesses two battle participants $A_1$ and $A_2$, while the faction of the BadGuys possesses the two battle participants $B_1$ and $B_2$. One possible group of GoodGuys might be given via $g_{Good}(A_1)=1$ and $g_{Good}(A_2)=2$, while a second group of GoodGuys is given via $g'_{Good}(A_1)=2$ and $g'_{Good}(A_2)=2$. That means, that group $g_{Good}$ consist of 3 battle participants, i.e. 1 unit of $A_1$ and 2 units of $A_2$. Group $g'_{Good}$ consists of 2 units of $A_1$ and 2 units of $A_2$. The group similarity metric $d_G$ helps determine the difference between two groups of the same faction by summing up the difference in all constituting battle participants. In this example we get $d_G(g_{Good}, g'_{Good}) = |g_{Good}(A_1) - g'_{Good}(A_1)| + |g_{Good}(A_2) - g'_{Good}(A_2)| = 1 + 0 = 1$.

Let $G_{Good}$ denote the set of all possible groups of GoodGuys in the game and $G_{Bad}$ denote the set of all possible groups of BadGuys in the game, respectively. Then the set of all samples in the game is given by $S = G_{Good} \times G_{Bad}$. Let $g_{Bad}$ be a group of BadGuys with $g_{Bad}(B_1)=2$ and $g_{Bad}(B_2)=0$, while $g'_{Bad}$ denotes a group of BadGuys with $g'_{Bad}(B_1)=0$ and $g'_{Bad}(B_1)=2$. One possible sample s∈S, is then given via $s=(g_{Good}, g_{Bad})$ and represents a situation in the game where 1 unit of $A_1$, 2 units of $A_2$, 2 units of $B_1$ and 0 units of $B_2$ are simulated in the game to determine the rank of these units in that special situation. s is a sample of size $|s|=1+2+2+0=5$. Another possible sample s'∈S might be given via $s'=(g'_{Good}, g'_{Bad})$ and represents a situation where 2 units of $A_1$, 2 units of $A_2$, 0 units of $B_1$ and 2 units of $B_2$ are simulated to determine the rank of all the units in that very situation. s' is a sample of size $|s'|=2+2+0+2=6$.

The purpose of the sampling is to create a set of situations, which are simulated in the game in order to determine the (average) performance of the game elements using the data returned by the game. It is this data that serves as the basis to approximate the rank functions of the battle participants.

The sample rank (function) $R_{bp}^{P(bp)}$ of a battle participant is defined as to give the local rank of a battle participant bp, with parameter vector P(bp), in a given sample s. The sample rank function is a mapping from the set of samples to the set of positive real numbers.

If the value of $R_{bp}^{P(bp)}$ is known for all samples s in S, then the exact rank of bp can be determined. Nevertheless, since in general it is not possible to calculate the sample rank for all accessible samples, it is necessary to approximate with only some values known. It is reasonable to assume that the more similar two samples are, the more similar a battle participant behaves in these samples.

In order to classify how similar samples are, the sample similarity metric is defined, which basically sums up the differences in groups within that sample, i.e. the sample similarity metric is defined via $d_S: S^2 \rightarrow N$ a with $$d_s(s, s') = \sum_{f \in F} d_G(s_f, s'_f).$$

where F is the set of all factions f. The smaller the similarity metric, the more similar are the two samples.

In the GoodGuys and BadGuys example, the similarity metric for $s=(g_{Good}, g_{Bad})$ and $s'=(g'_{Good}, g'_{Bad})$ evaluates to $$d_S(s,s') = d_G(g_{Good}, g'_{Good}) + d_G(g_{Bad}, g'_{Bad}) = 1+4=5.$$

In the most general case, one cannot assume to know anything about the behavior of the sample rank function. Therefore, it is advantageous to treat every possible sample in the same way. To do so, the concept of uniform sampling is introduced. A sampling $S' \subset S$ is called a uniform sampling of maximum size $\hat{m}$ and spread $\hat{s}$ if it fulfills the following conditions:

a) ( )∈S'; denotes the empty sample.
b) for all s∈S' it holds that $|s| \leq \hat{m}$ (size condition);
c) for all s,s'∈S' with s≠s' it holds that $d_S(s,s') \geq \hat{s}$; and
d) for all battle participants bp in the game and for all samples s∈S' with $|s| \leq \hat{m} - \hat{s}$ it holds that s+(bp ↪ ŝ)∈S' (spread condition). (bp ↪ ŝ) denotes the atomic sample containing ŝ instances of battle participant bp.

Basically, the uniform sample defines an evenly spaced grid in |BP|-dimensional space (|BP| denotes the number of battle participants in the game) and consequently leads to a completely unbiased distribution of samples. The samples are separated thus avoiding redundant information.

Note that maximum size and spread of the uniform sampling are introduced for practical reasons. If the sample size is not limited to some maximum this means that the number of possible samples is also unlimited. This, theoretically, means that we need an infinite amount of time to evaluate the results in the game. In addition, depending on the game under consideration, the evaluation of only finitely many, but very large samples will also take too long. Consequently a limitation of sample size is reasonable. The spread guarantees a minimum difference between samples in a uniform sampling. If two samples are very similar, it is very likely that evaluating these samples in the game leads to similar results; this, however, means that partially redundant information is simulated.

As an example of how the spread condition (condition (d) of the uniform sampling) can be applied to generate samples, assume that we have a sample of GoodGuys and BadGuys that contains 2 units of $A_1$, 0 units of $A_2$, 2 units of $B_1$ and 0 units of $B_2$. If we want to create a uniform sampling with spread 2 that contains said sample, condition (d) states that new samples in that sampling can be generated by adding 2 (i.e. the spread) units consecutively to each "component" of the sample, i.e. samples containing 4 units of $A_1$, 0 units of $A_2$, 2 units of $B_1$ and 0 units of $B_2$
2 units of $A_1$, 2 units of $A_2$, 2 units of $B_1$ and 0 units of $B_2$
2 units of $A_1$, 0 units of $A_2$, 4 units of $B_1$ and 0 units of $B_2$
2 units of $A_1$, 0 units of $A_2$, 2 units of $B_1$ and 2 units of $B_2$ are valid samples in that uniform sampling. This can be repeated as long as the size of resulting samples does not exceed the maximum size.

Having the uniform sample at hand, rank approximation can be described as follows:
a) approximate $\text{rank}^{P(bp)=x}(bp)$ for a fixed, default parameter vector x, by averaging over $R_{bp}^{P(bp)=x}(s)$ (for all s∈S').
b) For some fixed, nonzero natural number r̂, determine the r̂ most representative samples for bp. That is, determine the r̂ samples $s_i \in S'$, where $R_{bp}^{P(bp)=x}(s_i)$ is most similar to the approximation of $\text{rank}^{P(bp)=x}(bp)$ from step (a)
c) For each of these r̂ most representative samples and some fixed, nonzero natural number n̂, compute the approximate rank at n̂ different values of the parameter vector (see step (a)).
d) Using the results of step (c), interpolate an approximation of $\text{rank}^{P(bp)=x}(bp)$ in the variable x (i.e. in different values of the parameter vector of the battle participant).

Note that the approximation of the rank function needs the game to provide the data. To be more precise, a module implementing the aforementioned method needs to be connected to the game in order to compute the results of the different samples in the game. That is the game needs to provide an interface to the balancing module, that allows the balancing module to access, for example, the static game data (e.g. what factions and what resources are available in the game) and the dynamic game data (e.g. collection performance of any given resource collector, results of confrontations of given battle participants). However, these interfaces are completely game dependent.

6.2 Production DAG and Faction Modifiers

The following example (see FIG. 1) presents a simple production DAG for a faction with six actors $a_1, \ldots, a_6$ involved in the production/conversion process. Let R(a) denote the resource produced by an actor a. Let us furthermore assume that $R(a_1), \ldots, R(a_4)$ are pairwise distinct and let $R(a_3)=R(a_6)$. Only actors that take part in the production/conversion process are shown in the DAG and all other actors will be left out for the sake of simplicity (these would be isolated nodes in the DAG).

Each node (i.e. actor) of the DAG is annotated with its production time and total production time, as far as it is known yet. Each edge is annotated with its corresponding production cost, i.e. the resource flow (see FIG. 1).

Using the definition of the total production time, the total production time of the sources in the graph $(a_1,a_2)$ is already known, since it is equal to the normal production time. The result can be seen in FIG. 2.

Figure 1:
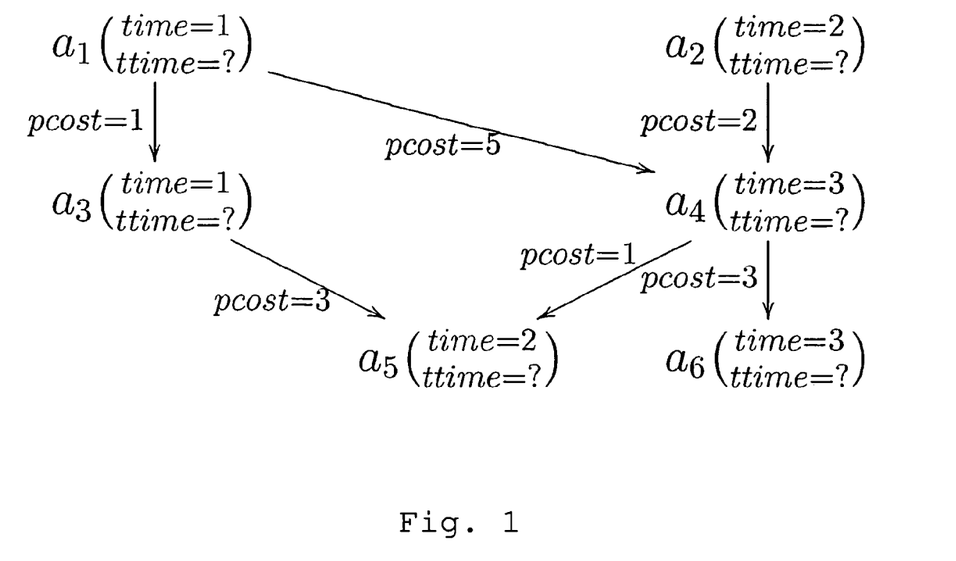
FIG. 1 production directed acyclic graph with unknown values in all layers.
Figure 2:
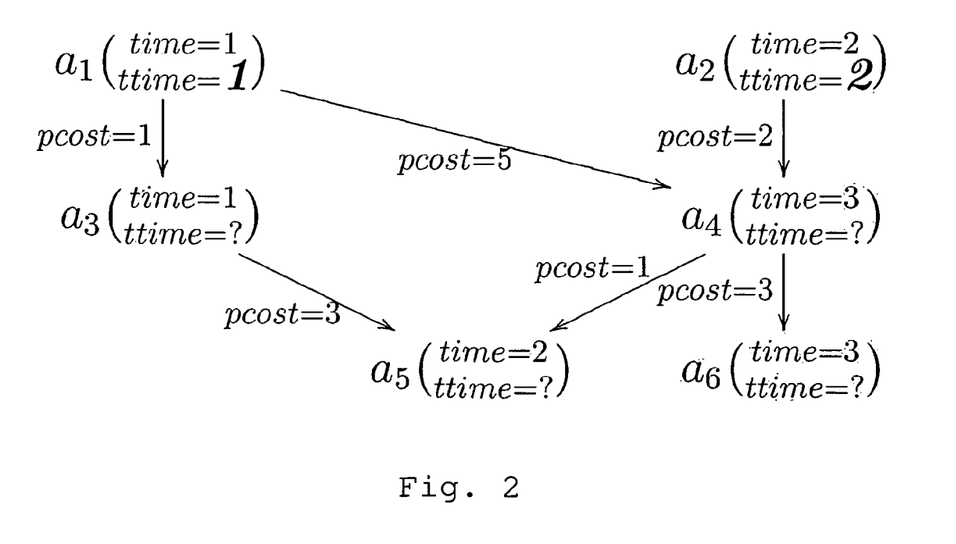
FIG. 2 production directed acyclic graph with unknown values in all but the first layer.

Applying the definition of total production time to the next layer, i.e. $(a_3,a_4)$, leads to $$ttime(a_3) = ttime(a_1) \cdot pcost([a_1, a_3 >) + time(a_3)$$
$$= 1 \cdot 1 + 1 = 2,$$

and $$ttime(a_4) = ttime(a_1) \cdot pcost([a_1, a_4 >) + ttime(a_2) \cdot$$
$$pcost([a_2, a_4 >) + time(a_4)$$
$$= 1 \cdot 5 + 2 \cdot 2 + 3 = 12.$$

Figure 3:
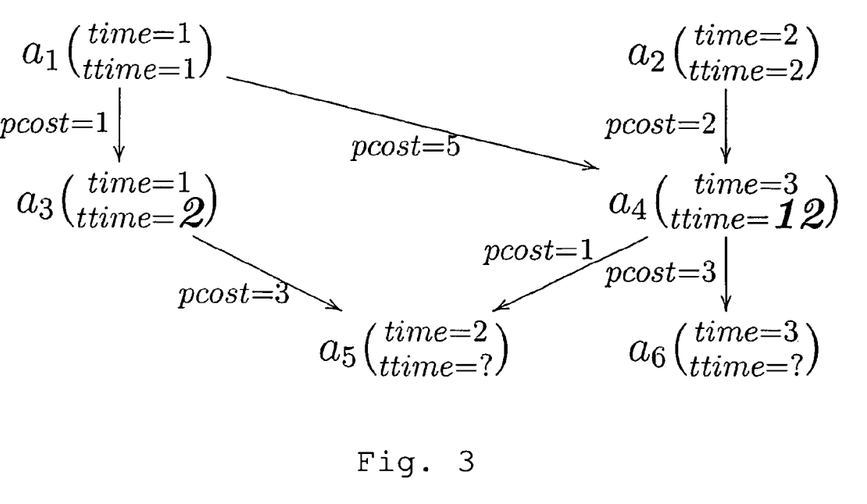
FIG. 3 production directed acyclic graph with unknown values in the very last layer.

This yields the updated DAG presented in FIG. 3. Finally, applying the total production time again to $a_5$ and $a_6$ this leads to the result in FIG. 4.

Figure 4:
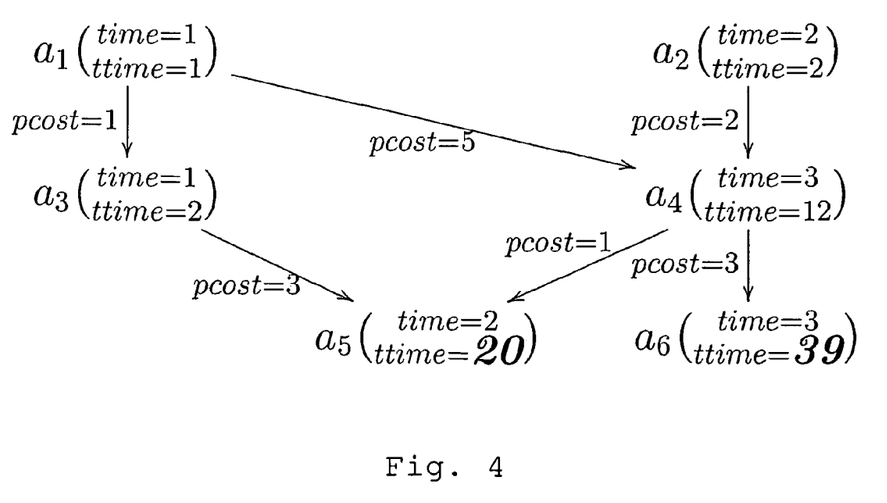
FIG. 4 production directed acyclic graph.

With the definition of the faction modifiers the results in FIG. 4 yield:

$$m_f(r(a_1)) = ttime(a_1) = 1,$$

$$m_f(R(a_2)) = ttime(a_2) = 2,$$

$$m_f(R(a_3)) = ttime(a_3) = 4,$$

$$m_f(R(a_4)) = ttime(a_4) = 12$$

$$m_f(R(a_5)) = m_f(R(a_6)) = \min\{ttime(a_5), ttime(a_8)\} = 20.$$

6.3 Cumulative Cost and Technology DAG

The following example presents a simple technology DAG based on three technologies $t_1, t_2, t_3$ and an upgrade $u_1 u_1$ and three actors $a_1, a_2, a_3$ with the following relations:
a) The technologies $t_2$ and $t_3$ both have technology $t_1$ as their only prerequisite.
b) The upgrade $u_1$ has the technology $t_1$ as prerequisite (i.e. obtaining $t_1$ makes $u_1$ available).
c) The actor $a_3$ has the technology $t_3$, and the actor $a_1$ the technology $t_2$ as prerequisite.
d) The actor $a_2$ has both the technologies $t_2$ and $t_3$ as prerequisites (i.e. $t_2$ and $t_3$ need to be obtained, before $a_2$ becomes available).

Figure 5:
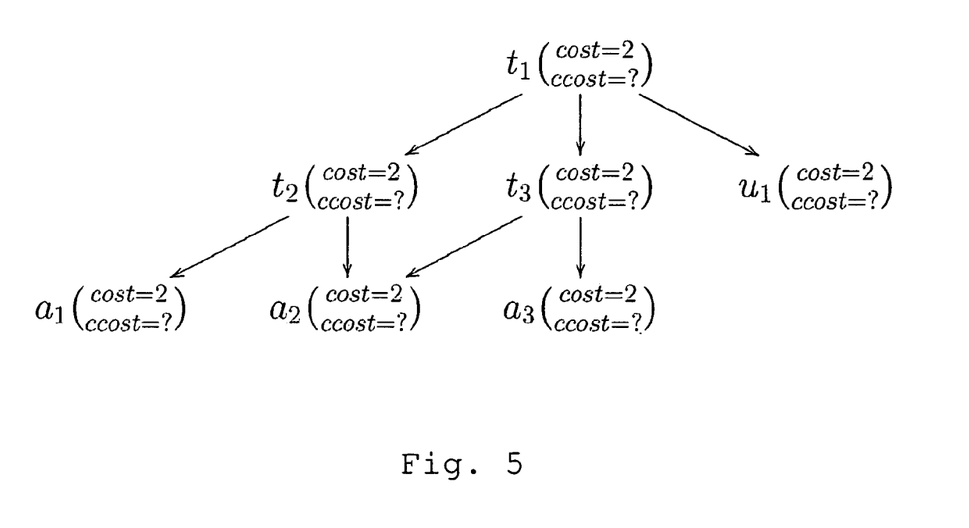
FIG. 5 technology directed acyclic graph with unknown values in all layers.

FIG. 5 shows the respective technology DAG. The nodes in the graph are annotated with the respective costs and cumulative costs, as far as they are known yet. To get the cumulative cost of all the game elements we perform a breadth first search on the technology DAG, applying the definition of cumulative cost.

Figure 6:
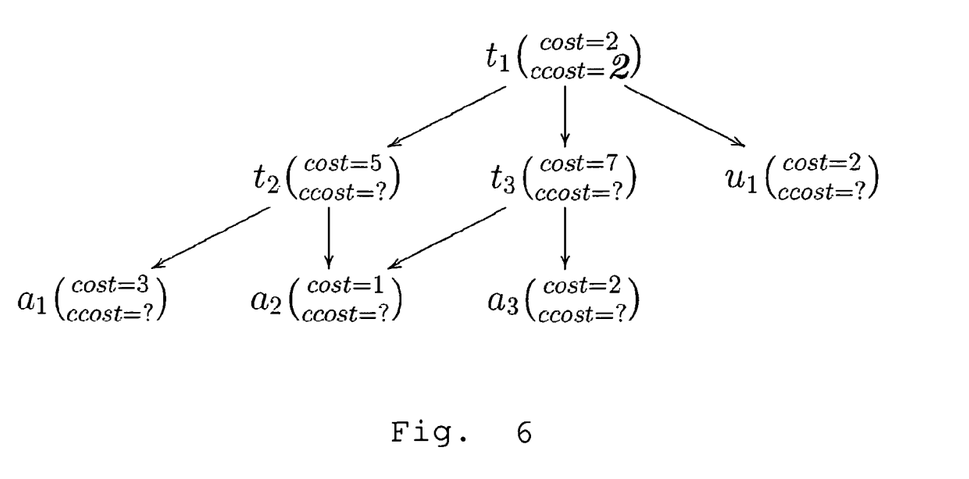
FIG. 6 technology directed acyclic graph with unknown values in all but the first layer.
Figure 7:
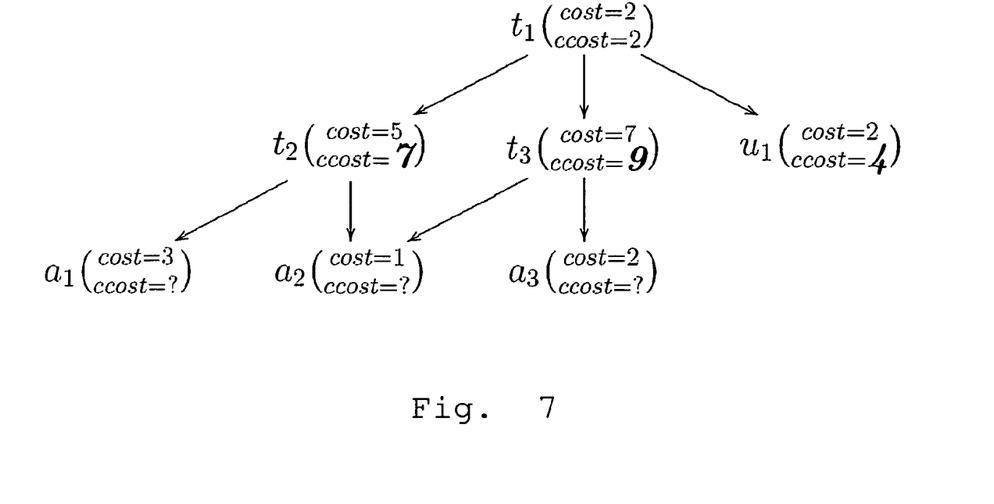
FIG. 7 technology directed acyclic graph with unknown values in the last layer.
Figure 8:
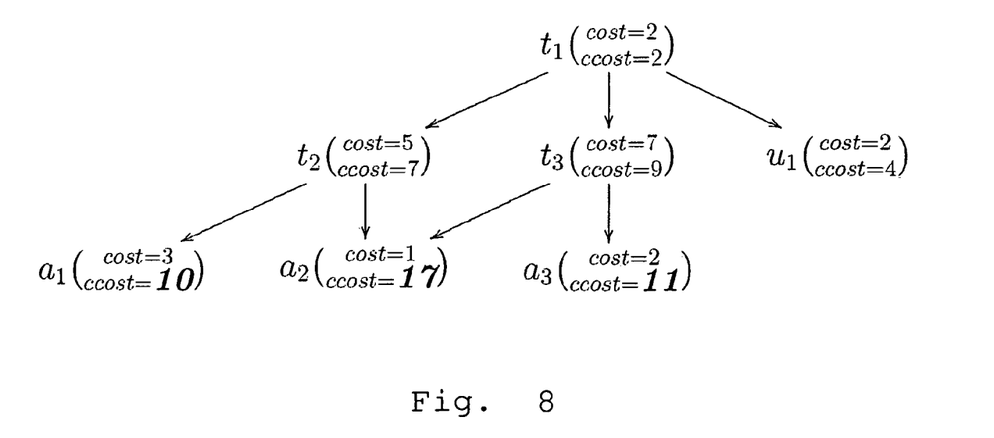
FIG. 8 technology directed acyclic graph.

After the first level this leads to the results presented in FIG. 6, and the results of the second step are given in FIG. 7. The final step results in FIG. 8. Consequently, the cumulative costs of the relevant game elements are:

$$ccost(a_1)=10,$$

$c\text{cost}(a_2)=17,$ $c\text{cost}(a_3)=11,$ and $c\text{cost}(u_1)=4.$

This way, the use of a technology DAG helps calculate the cumulative costs of actors.

6.4 Numerical Example

In what follows some results of a numerical test are presented as an example. The scenario is a simple RTS scenario with two factions, i.e. GoodGuys and BadGuys. A simple game has been implemented to simulate the confrontations of GoodGuys and BadGuys. The game gives data back to the balancer (e.g. for rank approximation of battle participants). The GoodGuys consist of:

Battle participants: GoodSoldier, GoodRocketGuy, Tank
Battle participant builders: GoodUnitBuilder
Resource collector: GoodMatterSource The BadGuys consist of:

Battle participants: EvilSoldier, EvilRocketGuy, Jeep
Battle participant builders: EvilUnitBuilder
Resource collector: EvilMatterSource Both factions have access to the same resource called Matter which is constantly made available in each faction's resource collector. There are no upgrades or technologies.

The parameters of the game elements for the GoodGuys are given as follows:

GoodSoldier: Health, Armor, Firepower, Firerate, MatterCost
GoodRocketGuy: Health, Armor, Firepower, Firerate, MatterCost
Tank: Health, Armor, Firepower, Firerate, MatterCost
GoodUnitBuilder: MatterCost, GoodSoldierProductionTime, GoodRocketGuyProductionTime, TankProductionTime
GoodMatterSource: GenerationSpeed, MatterCost.

The parameters of the BadGuys are given in an analogous manner:

BadSoldier: Health, Armor, Firepower, Firerate, MatterCost
BadRocketGuy: Health, Armor, Firepower, Firerate, MatterCost
Jeep: Health, Armor, Firepower, Firerate, MatterCost
BadUnitBuilder: MatterCost, BadSoldierProductionTime, BadRocketGuyProductionTime, JeepProductionTime
BadMatterSource: GenerationSpeed, MatterCost.

Figure 9:
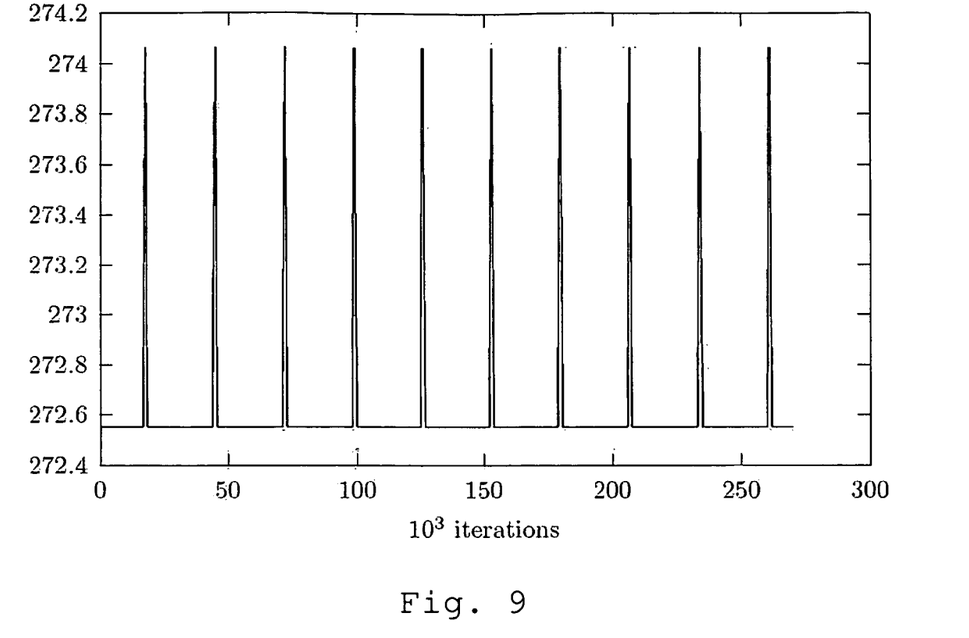
FIGS. 9, 10 and 11 show the results of three test-runs for different values of the spread of the uniform sampling, maximum sample size, and number of the samples within the uniform sampling.
Figure 10:
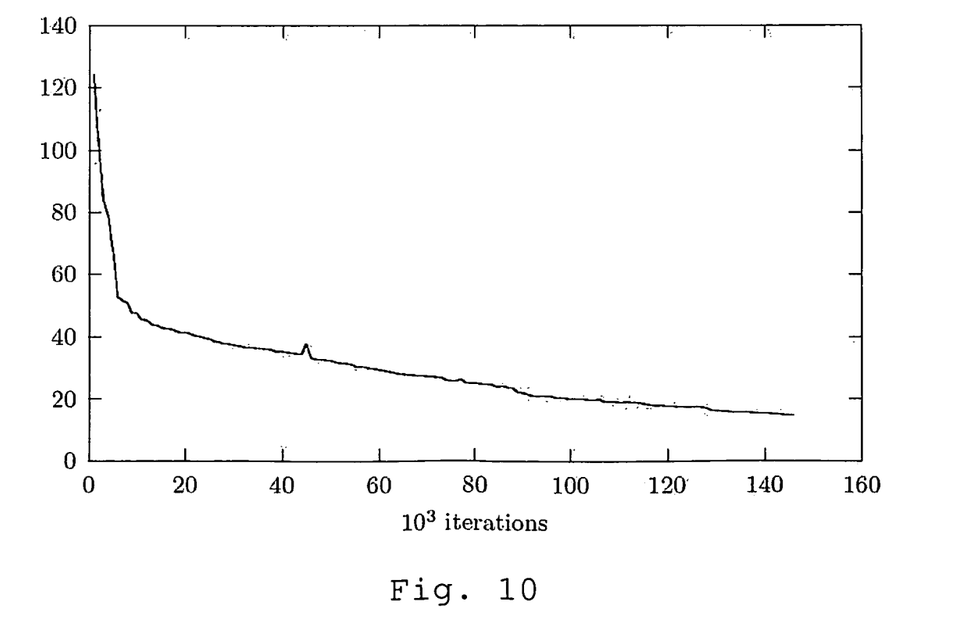
Figure 11:
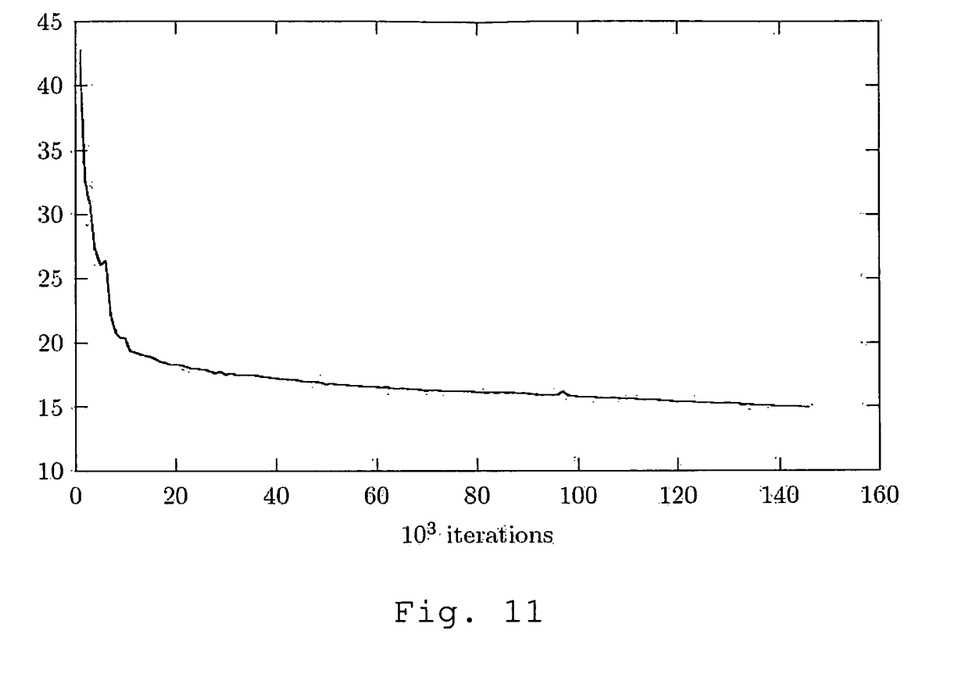

The balancing equations have been solved using a standard Powell-Hybrid method (see e.g. [PO70a] and [PO70b] for more information). FIGS. 9, 10 and 11 show the results of three test-runs (the start parameters of the GoodGuys and the BadGuys have not been varied in the three test-runs) for different values of the spread of the uniform sampling, maximum sample size, and number of the samples within the uniform sampling. The figures' abscissa gives the number of iterations while the ordinate presents the overall imbalance of the game (calculated as the absolute value of the residual of the solution of the balancing equations).

FIG. 9 is calculated using 64 samples (i.e. for the uniform sampling S' it holds $|S'|=64$) of spread $\hat{s}=2$ and a maximum sample size $\hat{m}=24$. FIG. 10 is calculated using 729 samples (i.e. for the uniform sampling S' it holds $|S'|=729$) of spread $\hat{s}=2$ and a maximum sample size $\hat{m}=36$. FIG. 11 is calculated using 46656 samples (i.e. for the uniform sampling S' it holds $|S'|=46656$) of spread $\hat{s}=1$ and a maximum sample size $\hat{m}=36$.

In FIG. 9 no convergence of the balancing process can be seen, i.e. the total imbalance is oscillating over a large number of iterations. The reason is that 64 samples are utterly insufficient to provide a sound data basis.

FIGS. 10 and 11 show a convergent balancing process where a larger number of samples leads to a better balance of the game. The number of samples, the number of representative samples to choose, the number of nodal points for the rank approximations etc. are completely dependent on the scenario under consideration and cannot be given in a general way.

The optimization is performed using the following steps:

A uniform sampling of the rank of all battle participants is performed for many different sets of parameters. This uniform sampling is performed only once.

The rank of all other actors is calculated.

The result of the uniform sampling allows an approximation of the rank of the battle participants as a highly dimensional function of the parameters.

Finally, using the calculated and approximated functions of the rank, an optimization in the highly dimensional parameter space is performed to find a minimum of the residue.

While the present inventions have been described and illustrated in conjunction with a number of specific embodiments, those skilled in the art will appreciate that variations and modifications may be made without departing from the principles of the inventions as herein illustrated, as described and claimed. The present inventions may be embodied in other specific forms without departing from their spirit or essential characteristics. The described embodiments are considered in all respects to be illustrative and not restrictive. The scope of the inventions are, therefore, indicated by the appended claims, rather than by the foregoing description. All changes which come within the meaning and range of equivalence of the claims are to be embraced within their scope.

REFERENCES CITED

[BG05] Brian Green, "Balancing Gameplay for Thousands of Your Harshest Critics". In Thor Alexander (editor), "Massively Multiplayer Game Development 2", pages 35-55, Hingham, 2005, Charles River Media.

[BH03] Ben Hanson, "Game Balance For Massively Multiplayer Games". In Thor Alexander (editor), "Massively Multiplayer Game Development", pages 30-37, Hingham, 2003, Charles River Media.

[JO03] John M. Olsen, "Game Balance and AI Using Payoff Matrices". In Thor Alexander (editor), "Massively Multiplayer Game Development", pages 38-48, Hingham, 2003, Charles River Media.

[PO70a] M. J. D. Powell, "A Hybrid Method for Nonlinear Equations". In P. Rabinowitz (editor), "Numerical Methods for Nonlinear Algebraic Equations", pages 87-114, London, 1970, Gordon and Breach.

[PO70b] M. J. D. Powell, "A Fortran Subroutine for Solving Systems of Nonlinear Algebraic Equations". In P. Rabinowitz (editor), "Numerical Methods for Nonlinear Algebraic Equations", pages 115-161, London, 1970, Gordon and Breach.

The invention claimed is:

1. Method of balancing a computer game, in which at least one player can choose at least one actor within the game and/or between different options for the at least one actor, comprising the following steps:

a) providing at least one parameter vector defining characteristics of the at least one actor;

b) defining the cost of the at least one actor, wherein the cost of an actor characterizes the amount of inherent game elements which can be consumed or produced by actors needed to obtain the actor;

c) defining the rank of the at least one actor, wherein the rank of an actor characterizes a usefulness or a value of the actor;

c1) wherein the rank of the at least one actor is continuous with respect to changes in said parameter vector;

d) modifying the parameter vectors of the at least one actor until the rank of the at least one actor is proportional to the cost of the at least one actor, wherein the constant of proportionality is the same for all actors, e) whereby the various options become approximately equally successful.

2. Computer program, wherein the computer program is adapted to perform the method according to claim 1 while the computer program is being executed on a computer.

3. A computer loadable data structure, that is adapted to perform the method according to claim 1 while the data structure is being executed on a computer.

4. A non-transitory storage medium, wherein a data structure is stored on the storage medium and wherein the data structure is adapted to perform the method according to claim 1 after having been loaded into a main and/or working storage of a computer or of a computer network.

5. A computer system for balancing a computer game, in which at least one player can choose at least one actor within the game and/or between different options for the at least one actor, comprising:

a) means for providing at least one parameter vector defining characteristics of the at least one actor;

b) means for defining the cost of the at least one actor, wherein the cost of an actor characterizes the amount of inherent game elements which can be consumed or produced by actors needed to obtain the actor;

c) means for defining the rank of the at least one actor, wherein the rank of an actor characterizes a usefulness or a value of the actor;

c1) wherein the rank of the at least one actor is continuous with respect to changes in said parameter vector;

d) means for modifying the parameter vectors of the at least one actor until the rank of the at least one actor is proportional to the cost of the at least one actor, wherein the constant of proportionality is the same for all actors, e) whereby the various options become approximately equally successful.

* * * * *